United States Patent [19]

Yanai et al.

[11] Patent Number: 4,642,760
[45] Date of Patent: Feb. 10, 1987

[54] STATUS-CHANGE DATA GATHERING APPARATUS

[75] Inventors: Takao Yanai, Hitachi; Yoshiaki Takahashi, Mito, both of Japan

[73] Assignee: Hitachi, Ltd., Tokyo, Japan

[21] Appl. No.: 526,795

[22] Filed: Aug. 26, 1983

[30] Foreign Application Priority Data

Aug. 30, 1982 [JP] Japan .................................. 57-149167

[51] Int. Cl.$^4$ ........................ G06F 13/24; G05B 11/01
[52] U.S. Cl. .................................... 364/200; 364/143
[58] Field of Search ... 364/200 MS File, 900 MS File, 364/141, 143, 184; 371/62

[56] References Cited

U.S. PATENT DOCUMENTS

| | | | |
|---|---|---|---|
| 3,334,334 | 8/1967 | Halpin | 364/200 |
| 3,611,311 | 10/1971 | Andrews | 364/200 |
| 3,927,394 | 12/1975 | Sugai | 364/200 |
| 4,219,881 | 8/1980 | Wilske | 364/900 |

*Primary Examiner*—James D. Thomas
*Assistant Examiner*—Florin Munteanu-Ramnic
*Attorney, Agent, or Firm*—Antonelli, Terry & Wands

[57] ABSTRACT

In a status-change gathering apparatus wherein status-change data is supplied to a processor from a plurality of inputting devices having a function of detecting status changes in a process or the like, each of the inputting devices is capable of producing an enable signal at a period not greater than the maximum allowed time between a detected status change in a controlled process and the controlling action to be performed by the processor, and of supplying the processor directly with an interrupt signal for requesting data gathering only when the enable signal is "on" and the status change has been detected. Upon receiving an interrupt signal from at least one inputting device, the processor sends a sense signal to all inputting devices, and any inputting device which has generated an interrupt signal places a response signal on a unique line to the processor to identify that inputting device. In this way, sequential scanning of inputting devices to detect changes in status is avoided.

2 Claims, 4 Drawing Figures

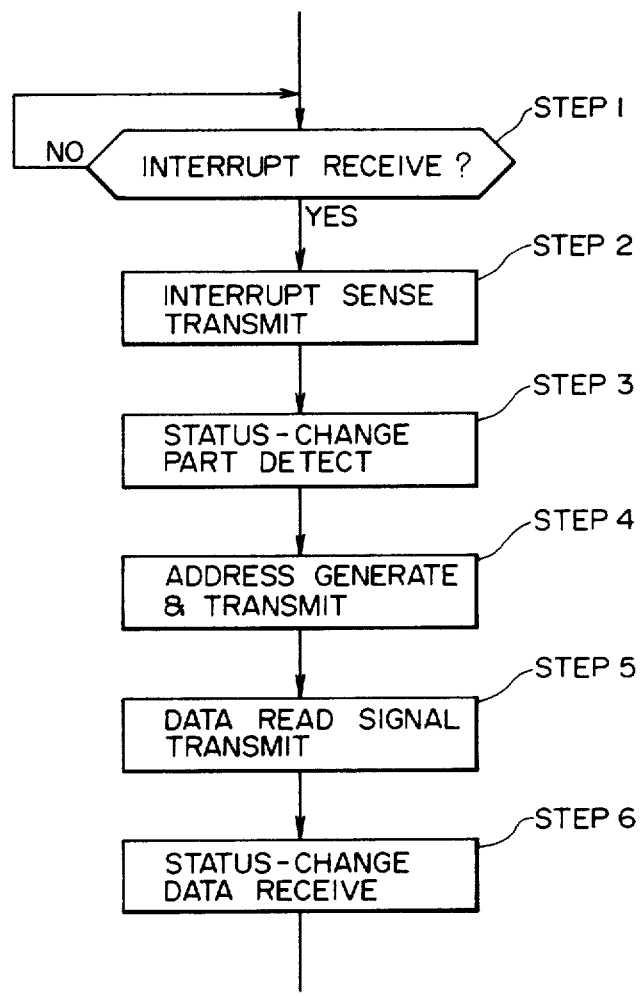

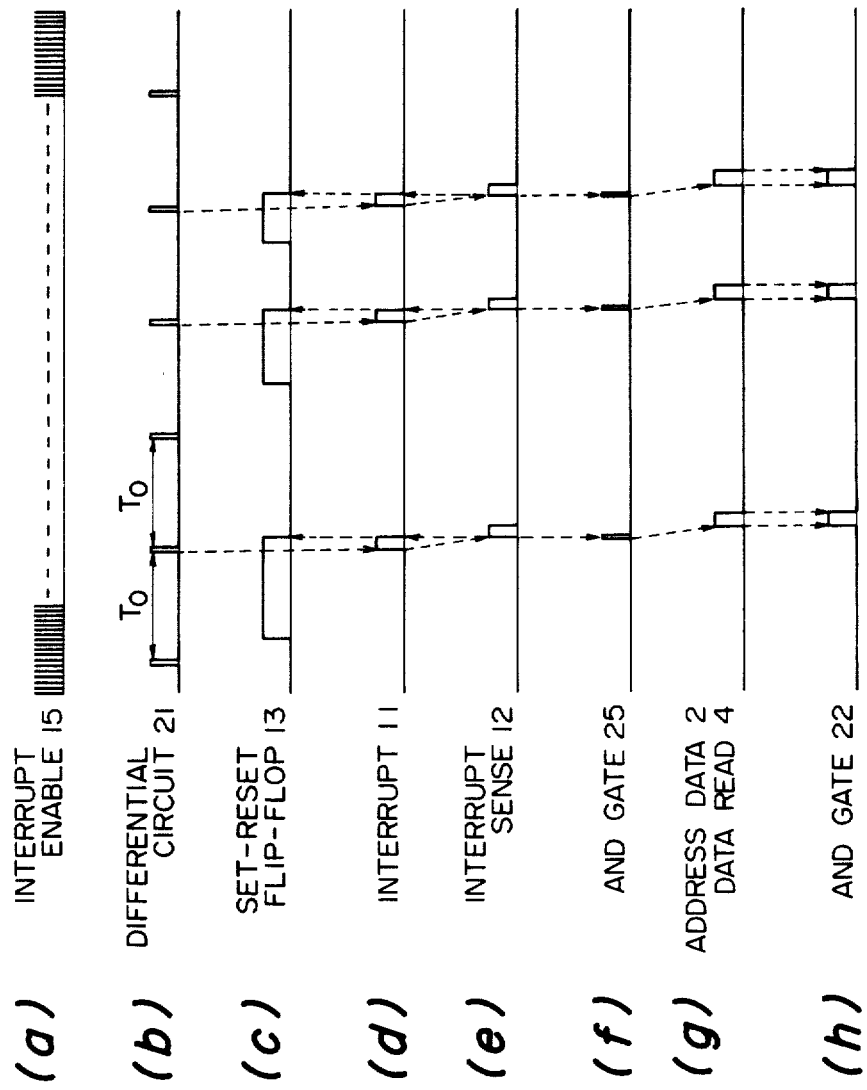

STATUS-CHANGE DATA GATHERING APPARATUS

BACKGROUND OF THE INVENTION

The present invention relates to an apparatus for gathering information relating to status changes to be used in, for example, a supervisory control and data aquisition system (hereinbelow, abbreviated to "SCADA system").

In a SCADA system, data respectively gathered by a plurality of remote stations is supplied to a master station, and a supervisory control is performed on the basis of this data. Each of the remote stations includes a plurality of status-change detectors and a processor which gathers data from the detectors and transmits this data to the master station. Since the present invention is well-suited for application to such information gathering processing within the remote station, the processing within the remote station of the SCADA system will be explained below by way of example.

The status-change detector in the remote station has the functions of supervising one or more plant apparatuses and storing the occurrence of a status change in the plant apparatus. Usually, it includes one to two printed circuit boards. Methods in which data sensed by the status-change detector is supplied to the processor are broadly classified into two types. One of the methods is such that the processor calls the respective status-change detectors in succession, and the status-change detectors transmit the stored status-change data to the processor in response to the calls. The other method is such that the detector having detected the occurrence of a status change interrupts the processor, and the processor then reads the status-change data.

Since, in the former case, the status-change detectors are successively called, there is the problem that the read cycle of the status-change data becomes long when a large number of the status-change detectors are provided. As a consequence, a desired time resolution for a status change cannot be secured. More specifically, it is desirable to feed the status-change data into the processor within a time $T_o$ after the occurrence of the status change. Nevertheless, when the number of the detectors is large, the read cycle becomes greater than the time $T_o$, and the desired time resolution $T_o$ cannot be ensured. In order to ensure the time resolution, therefore, an additional processor needs to be provided. In addition, since the processor calls the status-change detectors and performs predetermined processing irrespective of the presence or absence of the status change, it has a high overhead. This imposes restrictions on the periods of time of the other processing (the transmission of data to the master station, the control of plant apparatus, etc.) of the processor.

Since, in the latter case, the processor receives only the status changes, the overhead based on such operation can be made lower than in the former case. However, the processing of the interrupt of one status change takes a certain time $T_2$. Therefore, when status changes are concentrated in one status-change detector, the time needed to process these interrupts (the number of the status changes times the processing time $T_2$) can become longer than the desired time $T_o$ described above, and the time resolution cannot be ensured in this case either.

SUMMARY OF THE INVENTION

An object of the present invention is to eliminate the disadvantages of the prior-art apparatuses mentioned above, and to provide a status-change data gathering apparatus in which, even when the number of status-change detectors has become large, the increase in the load of a processor is slight, and a time resolution for status changes can be held to a required precision.

In order to accomplish this object, the present invention has taken note of the fact that the time resolution for status changes is set in system specifications and that the attainment of the resolution suffices. Concretely, the status-change detectors are given a predetermined length of time during which to interrupt the processor and this length of time is determined by the required resolution for the system, and these detectors can interrupt the processor only when the status change has occurred within the allowed time.

BRIEF DESCRIPTION OF THE DRAWINGS

FIG. 3 is a flow chart showing the processing steps of gathering status changes in a processor (1) in FIG. 1; and FIG. 4 is a diagram showing the variation-with-time of signals at various parts in the device of FIG. 2.

DETAILED DESCRIPTION OF THE PREFERRED EMBODIMENT

Figure 1:
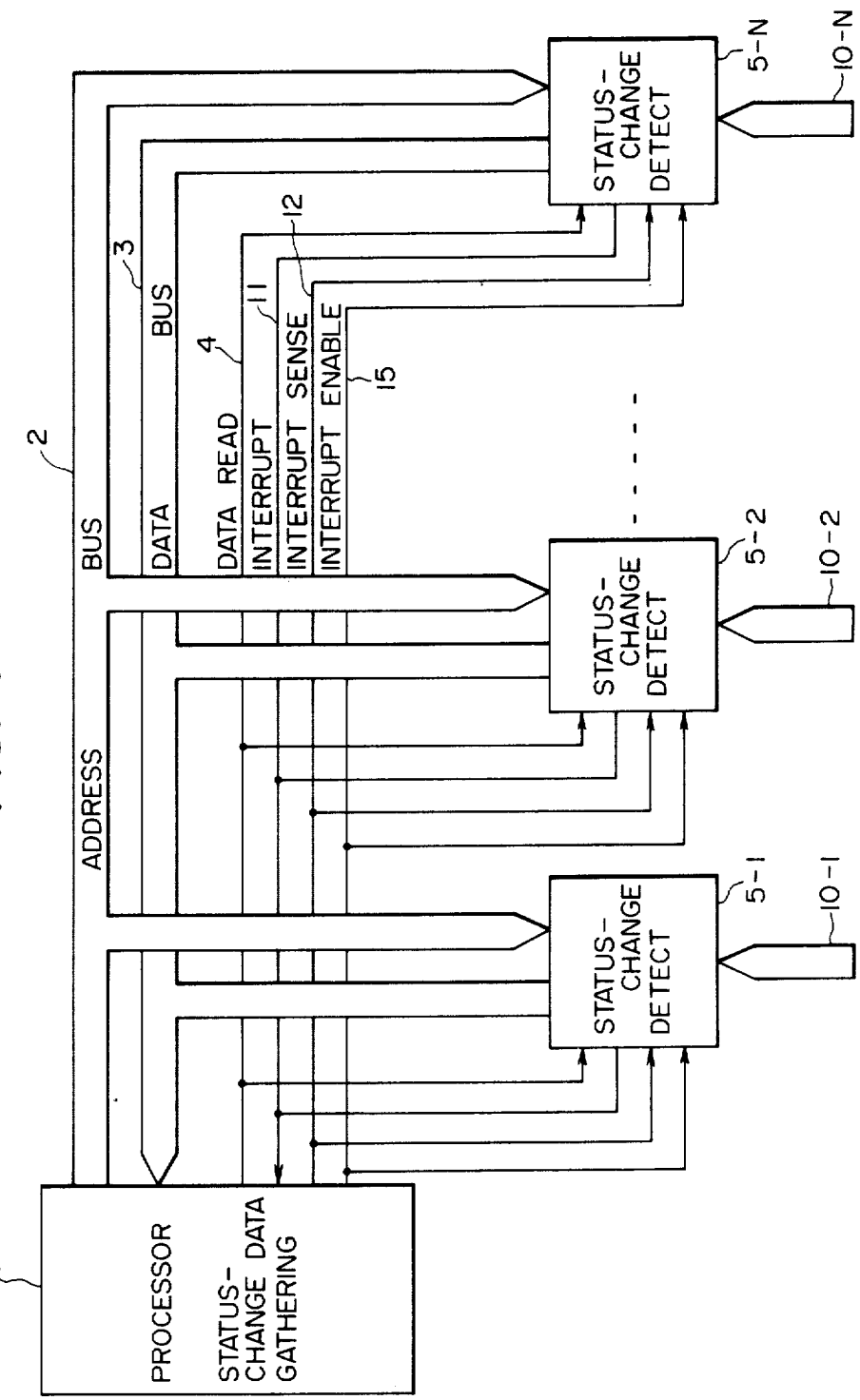
FIG. 1 is a schematic general setup diagram of a status-change data detecting apparatus of the present invention which is usable as, for example, the remote station of a SCADA system.

FIG. 1 shows the schematic setup of a status change detecting apparatus according to the present invention. When used in a SCADA system, the apparatus of FIG. 1 forms a remote station. That is, in constructing the SCADA system, a plurality of such remote stations as shown in FIG. 1 are employed, and signals are transmitted between them and a master station located in a distant place.

In the remote station of FIG. 1, it is a processor 1 that exchanges signals with the master station. The processor 1 sends the master station status-change data gathered by status-change detectors to be described below, and controls various terminal equipment on the basis of control signals issued by the master station. Since the present invention consists in detecting and gathering the status-change data, the control functions of the processor 1 will not be explained.

An address bus 2 and a data bus 3 extend between the processor 1 and a plurality of (in the illustrated example, N) status-change detectors 5. The processor 1 applies the address of the status-change detector 5 to communicate therewith, onto the address bus 2, while the status-change detector 5 applies status-change data, which it has detected, onto the data bus 3 so as to feed it to the processor 1. Besides, control signal lines 4, 11, 12 and 15 extend between the status-change detectors 5 and the processor 1. Original data 10 which is the subject of the status-change detection is inputted to each of the status-change detectors 5.

Figure 2:
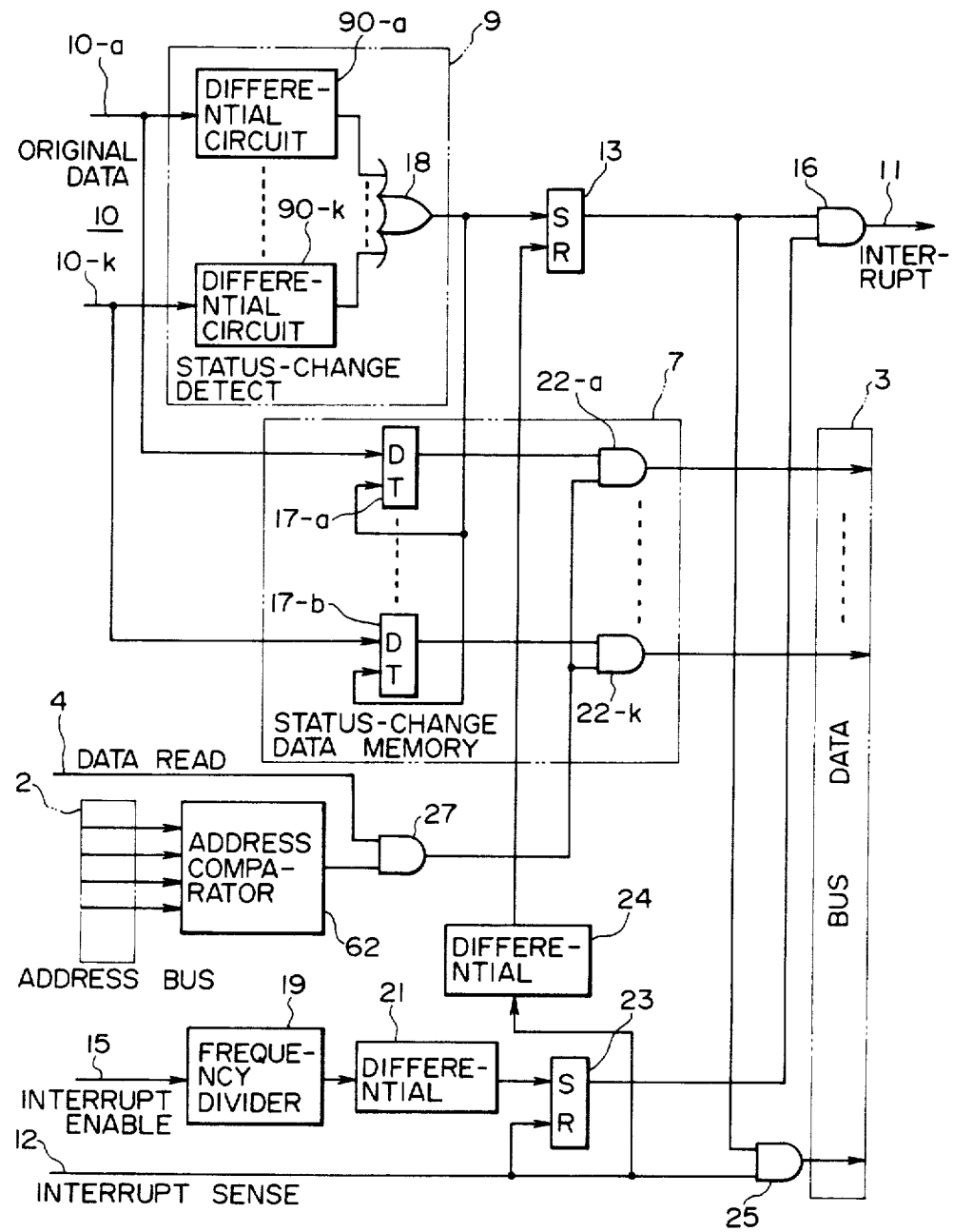
FIG. 2 is a detailed arrangement diagram of a status-change detector (5) in FIG. 1.

FIG. 2 shows the detailed arrangement of the status-change detector 5, while FIG. 3 is a flow chart illustrating the concept of status-change data gathering in the processor 1. In general, each status-change detector 5 in FIG. 2 receives a plurality of (assumed to be k in FIG. 2) original data. The data is applied to a status-change detector circuit 9 and a status-change data memory 7. In the circuit 9, the respective original data signals 10 are inputted to individual differential circuits 90, which sense the status changes from "1" to "0" or from "0" to "1". The outputs of the differential circuits 90 are applied to the set terminal S of a set-reset flip-flop 13 through an OR circuit 18. Thus, when any of the original data 10 indicates a status change, an output is generated from the flip-flop 13. The plurality of original data signals 10 applied to the status-change data memory 7 are inputted to the data terminals D of individual data-trigger flip-flops 17. The trigger terminals T of the flip-flops 17 are supplied with the output of the status-change detector circuit 9. Therefore, the signal is applied to the trigger terminals T of all the D-T flip-flops 17 immediately after the detection of the status change, and the inputs of the D terminals at this time are stored and outputted. The control signal line 15 in FIG. 1 is supplied with an interrupt enable signal, which is inputted to the status-change detector 5. This signal is a clock signal, and it has its frequency divided by a frequency divider 19 in the status-change detector 5 and becomes a rectangular wave signal at a predetermined frequency. The output of the frequency divider 19 is pulsed in a differential circuit 21, and a set-reset flip-flop 23 is set by the pulse. The output of the flip-flop 23 causes an AND circuit 16 to be enabled so as to provide an output when the flip-flop 13 is set. The output of the AND circuit 16 is sent to the processor 1 through the control signal line 11. The signal on the signal line 11 signifies that at least one of the status-change detectors 5 has detected a status change, and this signal serves as an interrupt signal for the processor 1. Here, the S-R flip-flop 23 provides its output every fixed period which is determined by the frequency divider 19. This period is set equal to, or less than a time resolution for the detection of the status change of the original data. More specifically, assuming that the time in which the status change is fed to the processor 1 after the occurrence thereof needs to be 2 (ms) or less, the frequency division of the frequency divider 19 is so determined that the output of the differential unit 21 is provided every period of 2 (ms) or less. Since the S-R flip-flop 13 is periodically reset as will be stated later, the AND circuits 16 of the status-change detectors 5 having detected no status change provide no output and therefore generate no interrupt signal. Owing to such arrangement, in the absence of any status change within the period, no interrupt is applied, and in the presence of at least one status change, the interrupt is applied.

As indicated at step 1 in FIG. 3, the processor 1 is monitoring the interrupt from the status-change detectors 5. Upon receiving the interrupt, the processor 1 transmits an interrupt sense signal to all the status-change detectors 5 at step 2. The interrupt sense signal is transmitted to the respective status-change detectors 5 through the control signal line 12. This signal is used for finding which of the status-change detectors 5 has issued the interrupt. In FIG. 2, an AND circuit 25 is enabled when the interrupt sense signal exists and also the output of the S-R flip-flop 13 exists (the status change exists). The information of this AND logic is sent to the processor 1 through the data bus 3. Signal lines for transmitting the outputs of such AND circuits 25 are independently provided for the respective status-change detectors 5, whereby the processor 1 can find which of the detectors 5 the status change has been issued from. Alternatively, the detector 5 having issued the status change can be found in such a way that the output of the AND circuit 25 is applied to a first signal line on the data bus 3 in the detector 5-1, to a second signal line in the detector 5-2 and to an N-th signal line in the detector 5-N. In the absence of the status change, the S-R flip-flop 13 provides no output, so that the AND gate 25 provides no output. Besides, the interrupt sense signal is used for resetting the S-R flip-flops 13 and 23. More specifically, the output of the AND circuit 16 is blocked (the interrupt signal is stopped) by resetting the flip-flop 23, and the output of the AND circuit 25 is blocked (the signal for informing the processor of the position of the status change is stopped) by resetting the flip-flop 13 through a differential circuit 24. As understood from the resetting operation of the flip-flop 13, this flip-flop 13 is normally held in the reset status, and as described before, the AND circuit 16 produces no output in the detector 5 issuing no status change, so no interrupt signal is provided. According to the circuit arrangement, the AND circuit 25 produces its output only in a short time after receiving the interrupt sense signal, until the flip-flop 13 is reset by this signal. However, the output duration of the AND circuit 25 can be adjusted by affording a proper time delay. Another problem is that, when the status change has occurred during the generation of the interrupt sense signal, the flip-flop 13 receives its inputs at the set terminal S and the reset terminal R at the same time, so its output is not determined. This problem, however, can be solved in practical use by making the output duration of the differential circuit 90 longer than the duration of the interrupt sense signal.

At step 3 in FIG. 3, which of the signal lines of the data bus 3 the output exists on is discriminated, whereby the detector 5 having issued the status change can be known. At the next step 4, the address of this detector 5 is delivered to the address bus 2. Simultaneously with the stopping of the interrupt sense signal, a read signal is delivered to the control signal line 4 at step 5. In FIG. 2, numeral 62 indicates an address comparator which has the address of that status change detector 5 stored therein and which provides an output when the address received through the address bus coincides with the set address. Although the read signal is applied to all the detectors 5, only the detector having issued the status change is properly called by detecting the coincidence between the read signal and the output of the address comparator 62 in an AND circuit 27. By applying the output of the AND circuit 27 to AND circuits 22, the status-change data stored in any of the D-T flip-flops 17 is read out and is sent to the processor 1 through the data bus 3. At step 6 in FIG. 3, the processor 1 receives the status-change data and performs processing corresponding thereto.

Referring to FIG. 4 in which the signals of the various parts in FIG. 2 are illustrated in time series, the functions of the circuit arrangement described above will be briefly reviewed. The interrupt enable signal (FIG. 4, (a)) is subjected to the frequency division, and the differential circuit 21 provides the output of the fixed period (FIG. 4, (b)). Although a status change arises any time (FIG. 4, (c)), the interrupt signal (FIG. 4, (d)) is provided for the first time when the output of the differential circuit 21 exists and the flip-flop 13 is set. The interrupt sense signal 12 (FIG. 4, (e)) is received by the status-change detector 5 in correspondence with the interrupt signal 11, whereby the flip-flop 13 is reset to stop the interrupt signal. As shown in FIG. 4, (f), the AND gate 25 provides the output of short duration, from which the processor 1 is able to identify the detector 5 having issued the status change. Then, the processor 1 provides the address data 2 and the data read signal 4. In accordance with the signals 2 and 4 (FIG. 4, (g)), the status-change data is delivered from the AND gate 22 as shown in FIG. 4, (h). The series of processing on one status change from the delivery of the interrupt signal to that of the status-change data is completed within the predetermined period set by the frequency divider.

According to the present invention described above in detail, the processor 1 responds only to a received interrupt and therefore has a low overhead. The interrupt (11 in FIG. 1) arises only once in a time interval which is determined by a time resolution. Accordingly, even when a large number of status changes have arisen in a short time, the processor is interrupted every time interval mentioned above. In the present invention, the interrupt is applied with the period shorter than the time resolution (or equal thereto), resulting in the effect that the resolution of the status-change detection can be made uniform irrespective of the number of the status change detectors. In addition, according to the embodiment, the frequency division ratio of the frequency divider 19 can be set at will, resulting in the effect that unequal status-change time resolutions can be realized for the respective status-change detectors.

What is claimed is:

1. A status-change data gathering apparatus comprising a plurality of status-change detectors which detect and deliver data representing status changes in a process or the like, and a processor connected to said status-change detectors for gathering the delivered data of said status-change detectors in response to receipt of an interrupt signal from at least one of said status-change detectors; each status-change detector including time limit means for providing an output signal every predetermined period, status-change detection means for detecting and storing status change data and for producing an output signal when status change data is detected, and interrupt means for supplying to said processor an interrupt signal to indicate the receipt of status-change data in the status-change detector in response to receipt of output signals from both said time limit means and said status-change detection means; and predetermined period of said time limit means being shorter than a desired time resolution for the detection of status-change data; wherein said processor comprises means responsive to receipt of the interrupt signal for sending an interrupt sense signal to all of the status-change detectors, and wherein each status-change detector further includes detector identifying means for transmitting a signal identifying that detector to said processor when both the interrupt sense signal is received and the output signal of said status-change detection means is produced therein.

2. A status-change data gathering apparatus according to claim 1, wherein said processor means further comprises means responsive to receipt of an identifying signal from the detector identifying means of a status-change detector for sending a data read signal and an address signal to said status-change detectors, and wherein said status-change detectors each include means responsive to receipt of a data read signal and an address signal identifying that status-change detector for sending to said processor the status change data stored by said status-change detection means therein.

* * * * *